(12) United States Patent
Toukairin

(10) Patent No.: US 10,725,854 B2
(45) Date of Patent: Jul. 28, 2020

(54) DISK DEVICE AND DATA MANAGEMENT METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Norikatsu Toukairin, Hino Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 40 days.

(21) Appl. No.: 16/120,407

(22) Filed: Sep. 3, 2018

(65) Prior Publication Data

US 2019/0295595 A1    Sep. 26, 2019

(30) Foreign Application Priority Data

Mar. 20, 2018  (JP) ................................ 2018-052773

(51) Int. Cl.
  *G06F 11/10*   (2006.01)
  *G11B 20/12*   (2006.01)
  *G11B 20/18*   (2006.01)

(52) U.S. Cl.
  CPC ...... *G06F 11/1004* (2013.01); *G11B 20/1217* (2013.01); *G11B 20/1833* (2013.01); *G11B 2020/1222* (2013.01); *G11B 2020/1232* (2013.01); *G11B 2020/1238* (2013.01)

(58) Field of Classification Search
  CPC ................... G06F 11/1004; G11B 2020/1222
  See application file for complete search history.

(56) References Cited

U.S. PATENT DOCUMENTS

| | | | |
|---|---|---|---|
| 4,424,543 A * | 1/1984 | Lewis ................ | G11B 5/59655 360/135 |
| 5,604,603 A | 2/1997 | Yoshinaka et al. | |
| 6,233,109 B1 * | 5/2001 | Melbye ................ | G11B 15/125 360/63 |
| 6,344,942 B1 * | 2/2002 | Yarmchuk ............ | G11B 5/5534 360/75 |
| 7,188,299 B2 | 3/2007 | Nakagawa et al. | |
| 9,837,115 B1 * | 12/2017 | Sridhara .................. | G11B 5/09 |
| 10,437,674 B1 * | 10/2019 | Sridhara ............... | G06F 11/108 |

(Continued)

FOREIGN PATENT DOCUMENTS

JP        S63-148471 A    6/1988

*Primary Examiner* — Joseph D Torres
(74) *Attorney, Agent, or Firm* — Kim & Stewart LLP

(57) ABSTRACT

A disk device includes a disk medium, a magnetic recording head, a processor configured to control the magnetic recording head to write data to and read data from a plurality of tracks of the disk medium on a sector-by-sector basis, and a check value generation circuit configured to generate, for each of the plurality of tracks, check value data based on data stored in one or more sectors of the track. The processor controls the magnetic recording head to write check value data for a first track of the plurality of tracks in a first sector on the disk medium and check value data for a second track of the plurality of tracks in a second sector on the disk medium that is adjacent to the first sector.

14 Claims, 6 Drawing Sheets

(56) References Cited

U.S. PATENT DOCUMENTS

| | | | |
|---|---|---|---|
| 2002/0060871 A1* | 5/2002 | Hamaguchi | G11B 5/012 360/48 |
| 2008/0244356 A1* | 10/2008 | Bliss | H03M 13/2906 714/755 |
| 2010/0064198 A1 | 3/2010 | Yoshida et al. | |
| 2017/0200470 A1* | 7/2017 | Kojima | G11B 20/1833 |

* cited by examiner

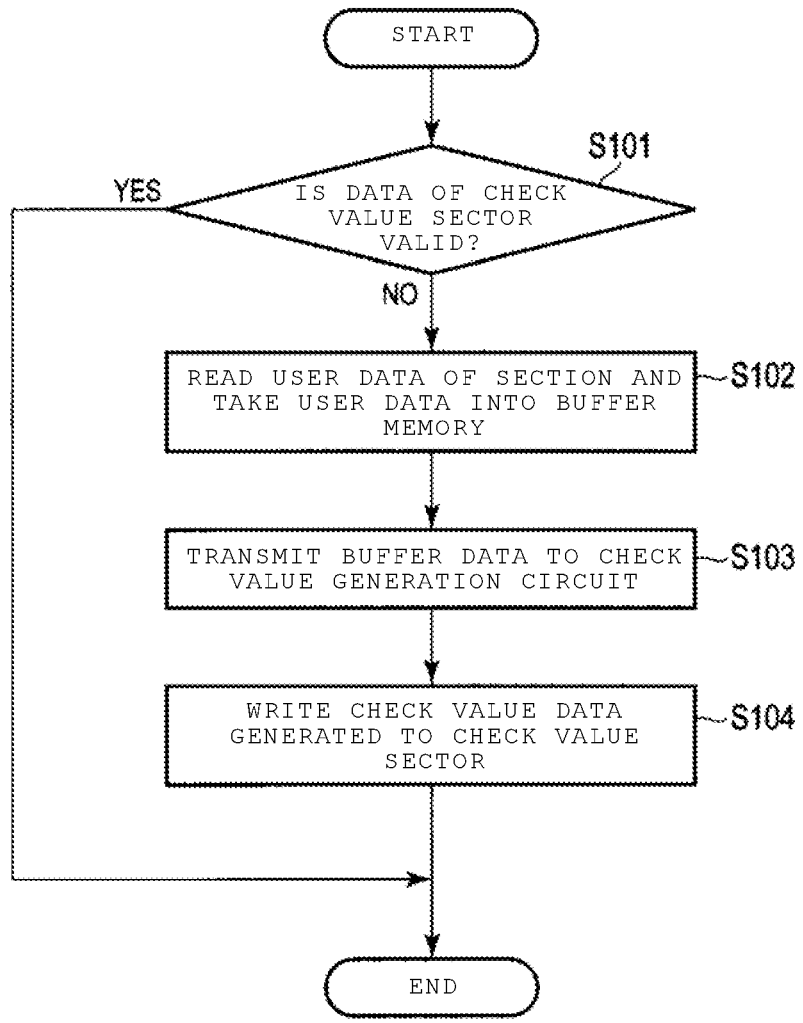

DISK DEVICE AND DATA MANAGEMENT METHOD

CROSS-REFERENCE TO RELATED APPLICATIONS

This application is based upon and claims the benefit of priority from Japanese Patent Application No. 2018-052773, filed Mar. 20, 2018, the entire contents of which are incorporated herein by reference.

FIELD

Embodiments described herein relate generally to a disk device and a data management method.

BACKGROUND

In a magnetic disk device, when additional data are written to the device and an error in reading information related to data management in the device occurs, due to the error, the amount of data corrupted is increased. An error detection and correction technique is devised and applied as a countermeasure against the error. Particularly, one means for error recovery is a device configured to add check value data, e.g., XOR data based on XOR (exclusive logical sum) calculated parity data.

In the related art, in the error recovering method which uses XOR data, all sectors allocated along a certain track are set as one user block and the XOR data is registered in the last check value sector (XOR sector). Accordingly, each time one or more sectors on a track are rewritten, the XOR sector for that track is also rewritten. Generally, during read and write processing of consecutive blocks, a phase of a sector position is shifted on each track circumferentially relative to adjacent tracks so as to optimize timing when reading multiple contiguous blocks of data. Therefore, since sector numbers are not radially aligned with each other, the rewriting of the XOR sectors has a strong effect, via adjacent track interference (ATI), on adjacent sectors in the radial direction. This causes an increase in the number of times data recovery processing (e.g., refresh processing) needs to be performed on the track that includes the adjacent sectors.

DESCRIPTION OF THE DRAWINGS

FIG. 3 is a flowchart illustrating an operation of XOR data generation processing of the magnetic disk device according to the present embodiment.

DETAILED DESCRIPTION

Figure 1:
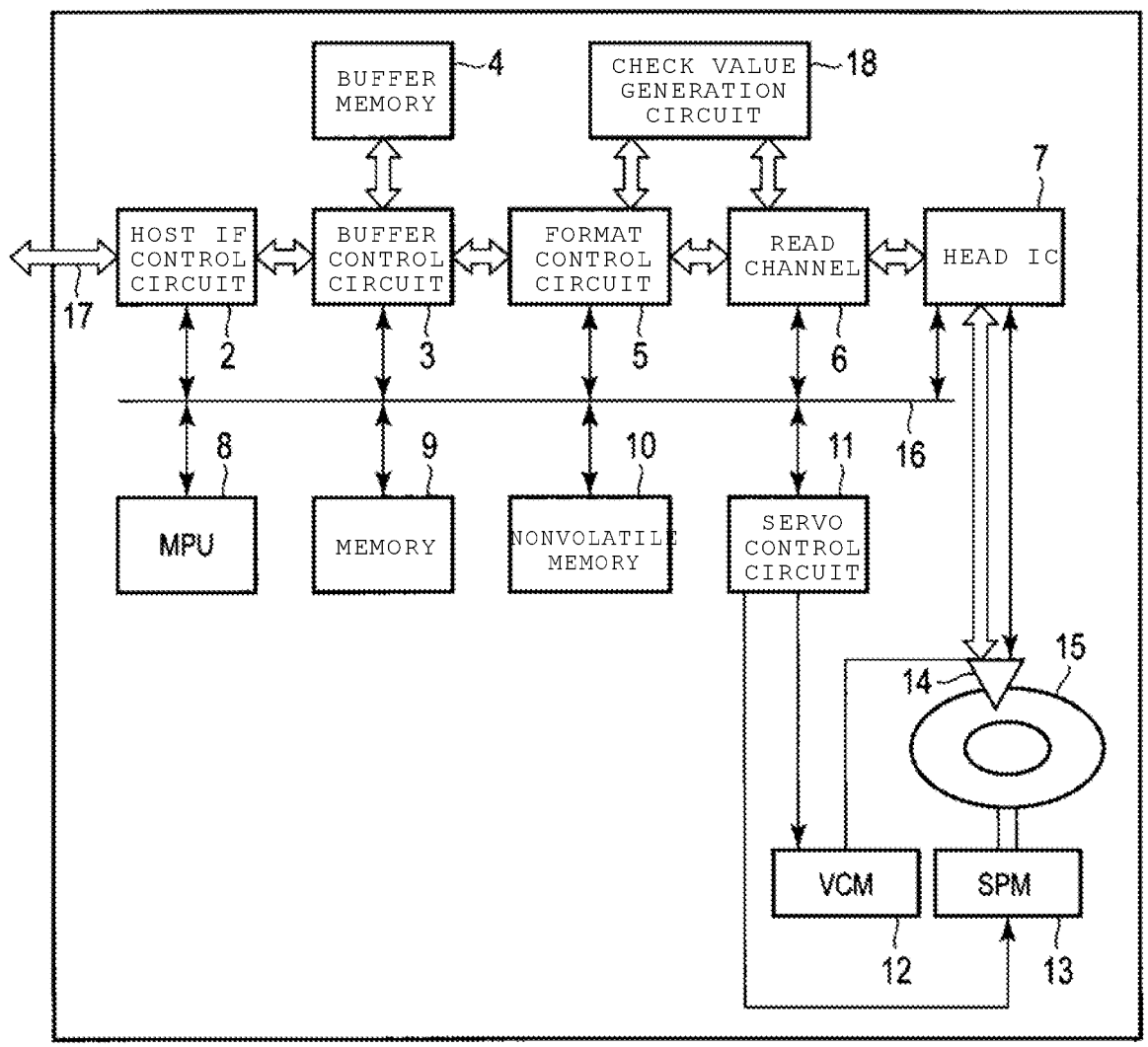
FIG. 1 is a block diagram illustrating a configuration of a magnetic disk device (HDD) according to the present embodiment.

Embodiments provide a disk device and a data management method that can prevent repeated writing to a check value sector from having pronounced ATI on a user area.

In general, according to one embodiment, a disk device includes a disk medium, a magnetic recording head, a processor configured to control the magnetic recording head to write data to and read data from a plurality of tracks of the disk medium on a sector-by-sector basis, and a check value generation circuit configured to generate, for each of the plurality of tracks, check value data based on data stored in one or more sectors of the track. The processor controls the magnetic recording head to write check value data for a first track of the plurality of tracks in a first sector on the disk medium and check value data for a second track of the plurality of tracks in a second sector on the disk medium that is adjacent to the first sector.

Hereinafter, embodiments will be described with reference to the drawings.

The disclosure is merely an example, and the scope of the present disclosure includes embodiments that those skilled in the art can appropriately implement by modifying the meaning of the disclosure. In addition, in order to make the description clearer, the drawings may be schematically illustrated in terms of a width, a thickness, a shape, and the like, of each element, and may not be to scale when compared with an actual implementation. Thus, the drawings only depict an example, and are not intended to limit the interpretation of the present disclosure. In addition, in the specification and each drawing, the same reference numerals or symbols are attached to the same elements as the elements described above with reference to the preceding drawings, and the detailed description thereof may be omitted for brevity and clarity.

FIG. 1 is a block diagram illustrating a configuration of an HDD according to the present embodiment. An HDD1 is connected to a higher device (not illustrated) via a host interface (IF). The higher device is, for example, a personal computer including the HDD1 as a storage device, and issues commands to the HDD1 for reading and writing data.

As illustrated in FIG. 1, the HDD1 includes a host IF control circuit 2, a buffer control circuit 3, a buffer memory 4, a format control circuit 5, a read channel 6, a head IC 7, an MPU (micro-processor unit which is programmed to function as a writing unit, a reading unit, an error position specifying unit, and an error position recording unit) 8, a memory 9, a nonvolatile memory 10, a servo control circuit 11, a voice coil motor (VCM) 12, a spindle motor (SPM) 13, a read and write head 14 (referred to herein as a magnetic recording head), a disk medium (a storage medium) 15, a common bus 16, a host IF 17, and a check value generation circuit 18.

The disk medium 15 stores data. In addition, the read and write head 14 writes and reads signals to and from the disk medium 15 as data; the SPM 13 is a motor that rotates the disk medium 15; the VCM 12 is a motor that drives the read and write head 14; the servo control circuit 11 controls the VCM 12 and the SPM 13, and the head IC 7 amplifies signals read from and written to the disk medium 15 by the read and write head 14. In addition, the read channel 6 converts data to be read from and written to the disk medium 15 into a signal; the format control circuit 5 generates a recording format of data to be recorded on the disk medium 15; the buffer memory 4 is a memory that temporarily storing data to be read from and written to the disk medium 15; the buffer control circuit 3 controls the buffer memory 4;

and the memory 9 is a volatile memory and stores a program for controlling the HDD. In addition, the host IF 17 is an IF that communicates data and commands to be read from and written to the disk medium 15 with a higher device; the MPU 8 performs control and processing of the HDD1; and the check value generation circuit 18 will be described below.

Generally, when data is read from the disk medium in HDD 1, the data is read from the disk medium 15 by the read and write head 14 and sent to the read channel 6 via the head IC 7. The data sent to the read channel 6 is temporarily held in the buffer memory 4 via the format control circuit 5 and the buffer control circuit 3. The data held in the buffer memory 4 is sent to the higher device via the host IF control circuit 2 and the host IF 17. In addition, when data is written to the disk medium in HDD 1, the data is temporarily held in the buffer memory 4 from the higher device via the host IF 17, the host IF control circuit 2, and the buffer control circuit 3. The data held in the buffer memory 4 is written to the disk medium 15 by the read and write head 14 via the format control circuit 5, the read channel 6, and the head IC 7 with timing suitable for writing.

Figure 2:
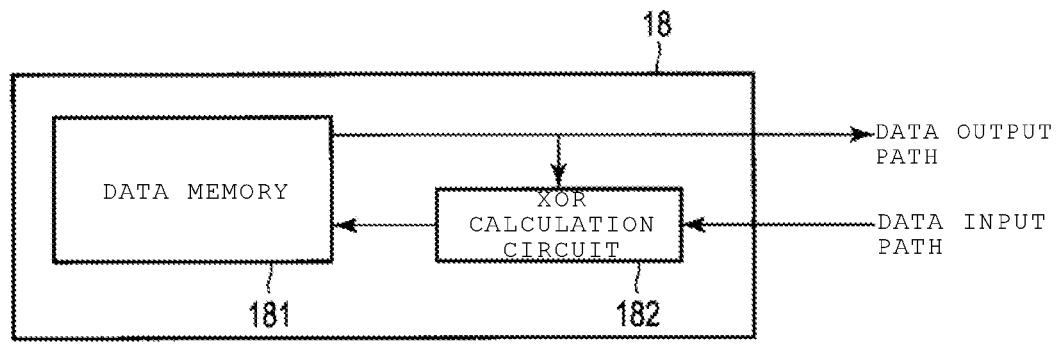
FIG. 2 is a block diagram illustrating a configuration of a check value generation circuit of the magnetic disk device according to the present embodiment.

Next, the check value generation circuit 18 according to the present embodiment will be described. FIG. 2 is a block diagram illustrating a configuration of the check value generation circuit 18.

As illustrated in FIG. 2, the check value generation circuit 18 includes a data memory 181 and an exclusive OR (XOR: exclusive logical sum) calculation circuit 182. The data memory 181 has a capacity of a sector size and holds arithmetic result data corresponding to one sector obtained by the XOR calculation circuit 182. In addition, the XOR calculation circuit 182 performs XOR arithmetic for each bit position, according to input data corresponding to input corresponding to one sector and the arithmetic result data corresponding to the one sector held in the data memory 181. The arithmetic result obtained by the XOR arithmetic performed by the XOR calculation circuit 182 is held in the data memory 181 as new arithmetic result data. The MPU 8 can read the arithmetic result data held in the data memory 181 via the common bus 16 and can use the arithmetic result data as check value data (XOR data).

The XOR calculation circuit 182 can recover error sector data by performing the XOR arithmetic for the XOR data and each sector (first block) of the user data other than the error sector data. In addition, even if the order of input data is changed, the arithmetic result data is not changed, and thus, even if all the sector data of a particular block is input in any order, the XOR calculation circuit 182 can obtain the same value for the XOR data as final arithmetic result data. In the same manner, regardless of the order in which the user data other than error sector data and the XOR data are input to the XOR calculation circuit 182 in a block where an error sector exists, the error sector data recovered as the final arithmetic result data can be obtained. In addition, even in a block having few sectors other than the final sector in the disk medium 15, all the sector data in the user data within the block is used, and thereby, the XOR data can be generated in the same manner as in other blocks, and the error sector data for the block can be recovered.

Next, XOR data generation processing will be described. FIG. 3 is a flowchart illustrating steps performed during XOR data generation processing. First, the MPU 8 determines whether or not data of the XOR sector in each section of the user data is valid, that is, whether or not check value data corresponding to the user data is written to the check value sector, by referring to the user data written to the disk medium 15 (S101).

When the data of the redundant sector is not valid (S101, NO), the MPU 8 causes the read channel 6 to read the user data in which ECC data in the block for which the data of the check value sector is not valid is added to each sector. That is, the MPU 8 causes the read channel 6 to read the user data for the block that corresponds to the check value sector is not valid. The MPU 8 stores the user data into the buffer memory 4 via the buffer control circuit 3 and the format control circuit 5 (S102).

Next, the MPU 8 causes the user data that was stored in the buffer memory 4 in step S101 to be transmitted to the check value generation circuit 18 via the format control circuit 5 (S103, arithmetic step), and writes the arithmetic result data in the data memory 181 to the check value sector for the block of the user data which is input data to the check value generation circuit 18 via the read channel 6 as the check value data (S104, writing step).

In addition, in step S101, when the data of the check value sector is valid (S101, YES), the MPU 8 ends the check value generation processing.

As such, the check value generation processing reads all the data in the block and updates the check value data for that block. In an instance in which all the data in the block is updated (that is, newly overwritten), it is necessary to perform updating without confirming whether or not the corresponding check value data is valid. Therefore, when all the sectors in the block are overwritten, the MPU 8 inputs the written data to the read channel 6 and inputs the data to the check value generation circuit 18, thereby, generating the check value data without reading data from the disk medium 15.

Next, an arrangement of the check value sectors (XOR sectors) on the disk medium 15 will be described with reference to FIGS. 4 and 5.

Figure 4A:
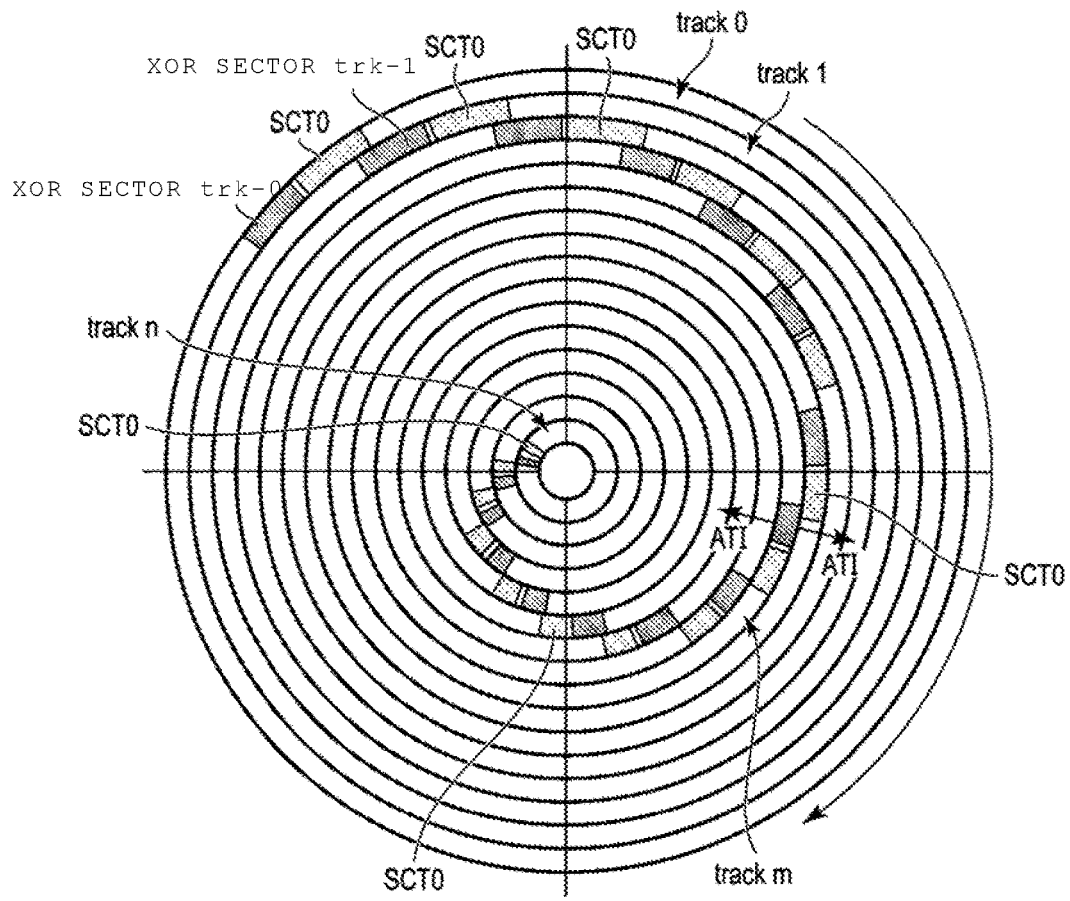
FIGS. 4A and 4B illustrate an example XOR sector arrangement of a magnetic disk device in the related art.
Figure 4B:
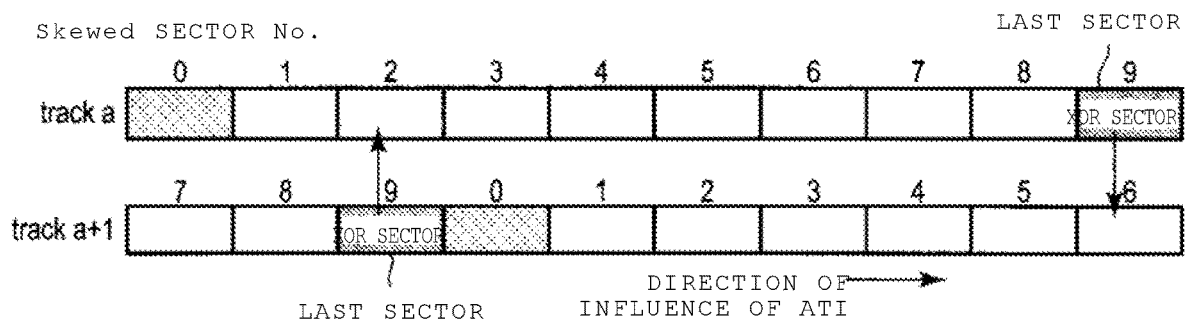

An arrangement example of the related art is illustrated in FIG. 4A. In FIG. 4A, each of XOR sectors trk-0 to trk-n is placed at an end of one sector in each of tracks 0 to n. In the respective tracks 0 to n, the arrangement of head sectors SCT0 is shifted in each track circumferentially, and thereby, distortion Skew is added, and positions of the XOR sectors trk-0 to trk-n do not match each other in a radial direction. That is, XOR sectors trk-0 to trk-n are not circumferentially aligned with the XOR sectors of adjacent tracks. Accordingly, writing to the XOR sector of a particular track causes ATI (side erase) to occur on an adjacent tracks in the user area. As a result, if the writing of data to the XOR sector of that particular track is repeated a sufficient number of times, data recorded in the adjacent sector is erased or otherwise corrupted. FIG. 4B illustrates a positional relationship in an instance in which a respective XOR sector is located at the last sector of track a and track a+1, which are tracks that are adjacent to each other. In this example, writing data to the last sector (sector 9) of track a causes ATI to occur on a sector 6 of track a+1. Conversely, writing data to the last sector (sector 9) of track a+1 causes ATI to occur on the sector 2 of track a.

First Example

Figure 5A:
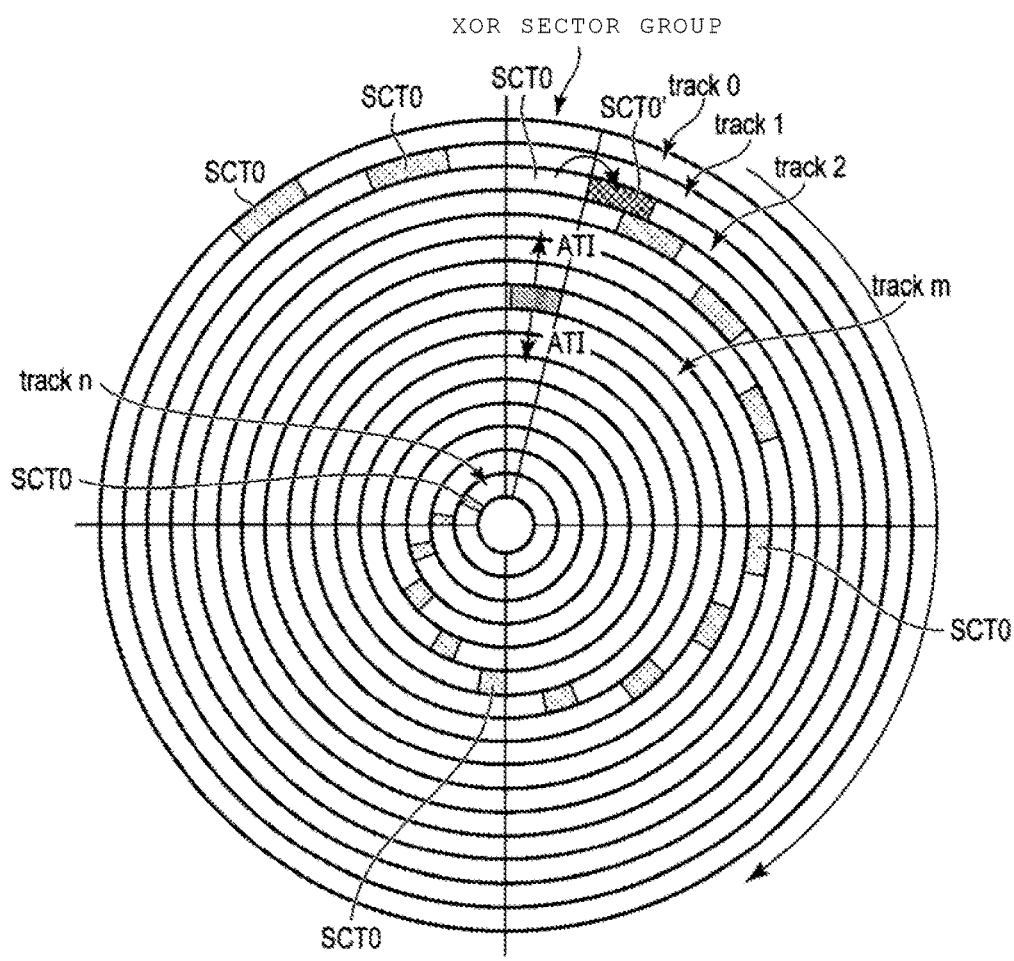
FIGS. 5A and 5B are conceptual diagrams illustrating an example OR sector arrangement according to a first example of the present embodiment.
Figure 5B:
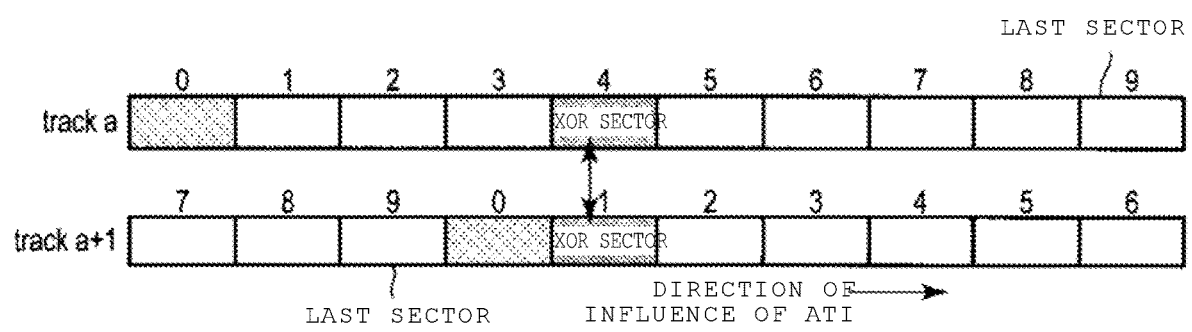

FIGS. 5A and 5B illustrate an example arrangement of XOR sectors according to a first example of the present embodiment. FIG. 5A illustrates an instance in which an XOR sector group is arranged in a position in each track that has the same phase, or circumferential location on disk medium 15. Consequently, the set of check value sectors for disk medium 15 are aligned in the radial direction. As a result, an XOR sector for a particular track is generally disposed in the user area of the track and not at the end of that track. By adopting this configuration, the effect of ATI (side erase) caused by updating a check value sector of a track is not on data of the user area of adjacent tracks. FIG. 5B illustrates a positional relationship in an instance in which predetermined adjacent sectors (sector 4 of track a and sector 1 of track a+1) are respectively set as the XOR sector for track a and track a+1. Specifically, sector 4 of track a and sector 1 of track a+1 are radially aligned, i.e., at least a portion of sector 4 of track a overlaps sector 1 of track a+1 in a circumferential direction of the disk medium 15. In this example, the XOR sector of track a (i.e., sector 4 of track a) and the XOR sector of track a+1 (i.e., sector 1 of track a+1) are affected by ATI when the XOR sector of an adjacent track is updated. However, the data of the user area is not affected by ATI when the XOR sector of an adjacent track is updated. If data of the user area is not affected by ATI, it is not necessary to recover data in the user area.

Figure 6:
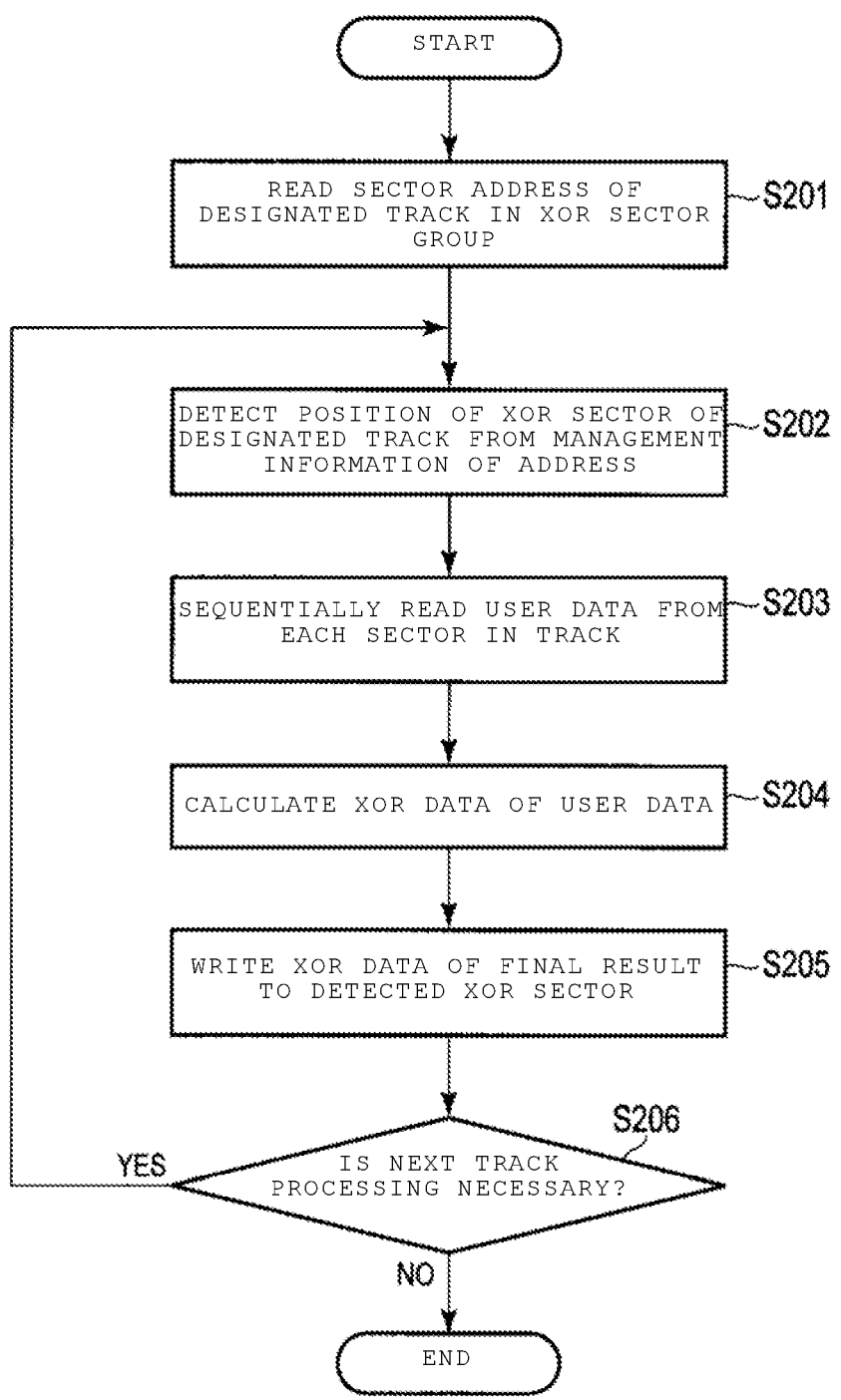
FIG. 6 is a flowchart illustrating a processing operation for writing XOR data to an XOR sector, according to the first example according to the present embodiment.

Writing of the XOR data to each track is performed according to a flowchart illustrated in FIG. 6. In FIG. 6, the MPU 8 first reads the sector address for the XOR sector group. The XOR sector group includes the XOR sector for each track. In some embodiments, each XOR sector in the XOR sector group has the same phase or circumferential location. That is, in such embodiments, the XOR sectors in the XOR sector group are radially aligned. MPU 8 then excludes the XOR sector for the track, and stores the addresses of the sectors of the track where user data is recorded (S201). Next, in the designated track, a position of the XOR sector is detected from stored address information (S202). The XOR sector is excluded from sectors to be read, and the user data is then sequentially read from each sector on the track (S203). The XOR data of the user data sequentially read from the track is then calculated (S204), and the XOR data of the final result is written to the XOR sector recognized in step S202 (S205). It is then determined whether or not processing of the next track is necessary (S206). If the next track processing is necessary, the process returns to step S202 and a series of XOR processing is repeated for the next track. If the next track is not designated, the processing ends.

Here, if data are updated in a certain track, i.e., if a rewritten sector exists in a certain track, the check value generation circuit 18 recalculates the check value data of the track including the rewritten sector and records the recalculated check value data in the check value sector of the corresponding track. In addition, check value data corresponding to a random track from the check value sector group can be read from the check value sector. Thereby, when the existence of an error block in the disk medium is detected, the corresponding sector data on each track including a portion of the error block is read out, the check value data is read from the check value sector corresponding to the track that includes a portion of the error block, and it is possible to recover the error block by performing inverse arithmetic.

As described above, in the present embodiment, predetermined sectors of each track that are aligned in the radial direction are organized as an XOR sector group, and XOR data on each track is written to the sectors included in the XOR sector group as an XOR sector. Since the effect of ATI extends into the radial direction, embodiments described herein prevent ATI from affecting user data. Thus, user data is protected from the writing and rewriting of data to the XOR sector for a track, which is advantageous over the related art.

Second Example

Figure 7A:
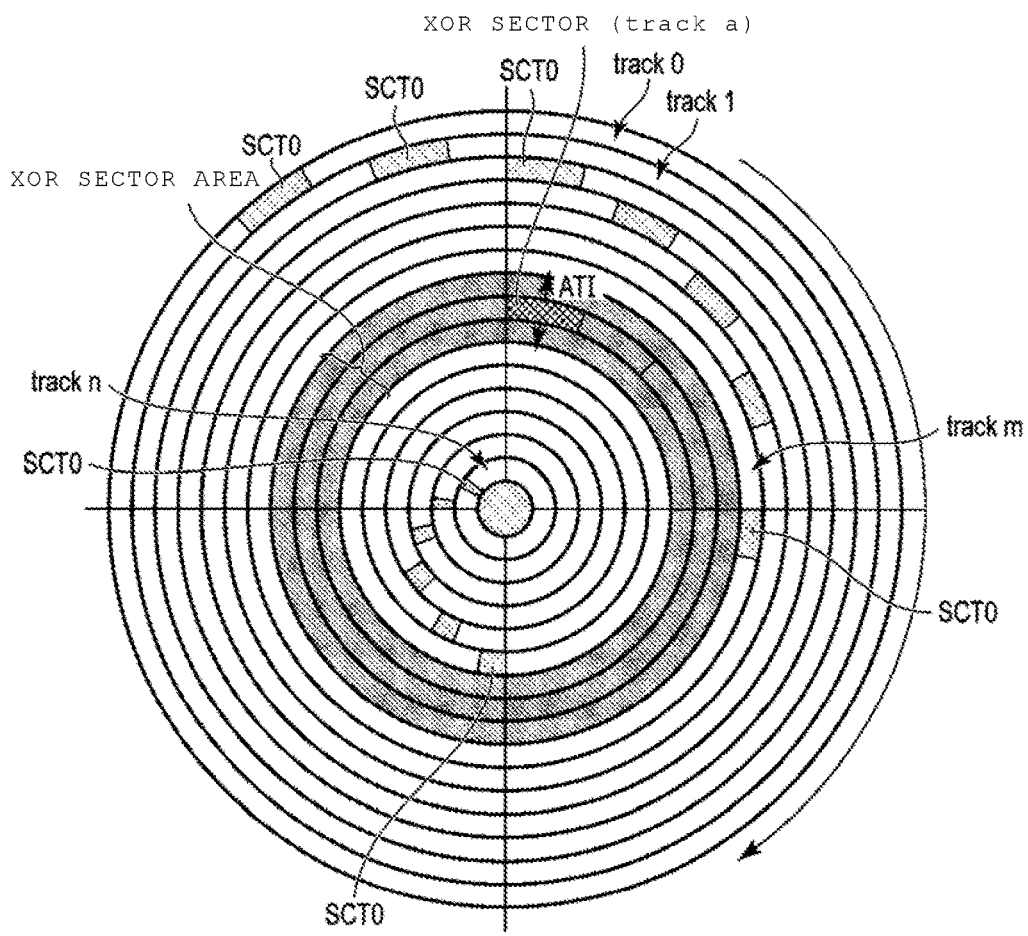
FIGS. 7A and 7B are conceptual diagrams illustrating a configuration of XOR sectors according to a second example of the present embodiment.
Figure 7B:
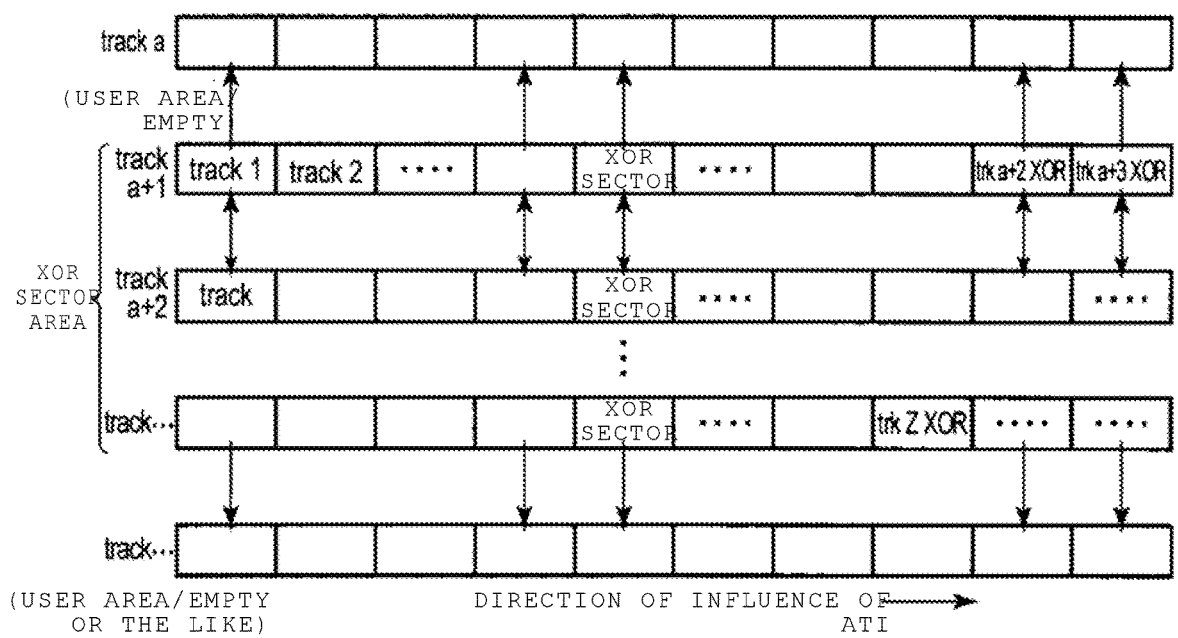

In the first embodiment, the XOR sector groups are arranged to have the same phase in each track, but the arrangement is not limited to a such a configuration. FIGS. 7A and 7B illustrate an arrangement example of XOR sectors according to a second example of the present embodiment. FIG. 7A illustrates a state in which an XOR sector group is arranged within tracks in a predetermined range. In a user area, a set of tracks in the predetermined range is configured as an XOR sector group, and an XOR sector for each track is allocated to the sector group, prior to normal operation of HDD1. By adopting such a configuration, data written in the user area is not affected by ATI (side erase) when XOR sectors are updated. The XOR sector group may be arranged in one place or may be arranged in a plurality of places on disk medium 15 and is not limited to one single location. In addition, since user area tracks adjacent to the outer radial side or the inner radial side of the tracks including the XOR sector group can be affected by ATI when XOR sectors are updated, in some embodiments, the tracks adjacent to an XOR sector is set as empty areas. FIG. 7B illustrates an example arrangement in which track a is set as an empty area which is a boundary between the user areas (not shown in FIG. 7B) and tracks configured as an XOR sector group (tracks a+1 to n). In the example, since the user area of track a is configured as an empty area, no problem occurs even if track a is affected by ATI due to frequent writing of data to the XOR sector of the adjacent track a+1. Data of the other user areas, which are further from the XOR sector group than track a, is not affected by ATI associated with writing data to XOR sectors. Consequently, corruption of data that requires data recovery is not necessary.

As described above, according to the first embodiment, XOR sectors are aligned in the radial direction, and thus, user data is not affected by ATI, and user data is protected. Alternatively, by arranging the XOR sectors in a certain area together, user data tracks that are adjacent to such areas can be affected by ATI from the XOR sectors, but it is possible to avoid ATI by taking the countermeasure of widening an interval between the XOR sector group(s) and the user data tracks. In addition, other user data is separated from the XOR sector group, leading to protection of user data. Since a sector to be used for data recovery and known location can be specified as the XOR sector, even if the user data is damaged due to power interruption or the like, data can be recovered from the corresponding track and the remaining sector of the track normally.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
   a disk medium;

a magnetic recording head;
a processor configured to control the magnetic recording head to write data to and read data from a plurality of tracks of the disk medium on a sector-by-sector basis; and
a check value generation circuit configured to generate, for each of the plurality of tracks, check value data based on data stored in one or more sectors of the track,
wherein the processor controls the magnetic recording head to write check value data for a first track of the plurality of tracks in a first sector on the disk medium and check value data for a second track of the plurality of tracks in a second sector on the disk medium that is adjacent to the first sector, the first and second sectors being disposed in a third track of the plurality of tracks.

2. The disk device of claim 1, wherein
the first sector comprises a first check value sector that stores the check value data for the first track and no check value data for any other track of the plurality of tracks, and
the second sector comprises a second check value sector that stores the check value data for the second track and no check value data for any other track of the plurality of tracks.

3. The disk device of claim 1,
wherein the check value generation circuit generates the check value data for the track by performing XOR operations on the data stored in the one or more sectors of the track.

4. The disk device of claim 1,
wherein the third track includes a plurality of check value sectors and no user data sectors.

5. The disk device of claim 1,
wherein the third track is adjacent to a fourth track that includes a plurality of check value sectors and no user data sectors.

6. The disk device of claim 5,
wherein the third track is adjacent to the fourth track on a first side of the third track and is adjacent to an empty area on a second side of the third track, wherein the empty area separates the third track from a fifth track that includes user data.

7. The disk device according to claim 1,
wherein, when the magnetic recording head writes data to a user data sector of a particular track in the plurality of tracks, the check value generation circuit recalculates check value data for the particular track and the magnetic recording head writes the recalculated check value data in a check value sector of the particular track.

8. A method of data management in a disk device that records data on a disk medium that includes a plurality of tracks, the method comprising:
generating, for each of the plurality of tracks, check value data based on data stored in one or more sectors of the track; and
writing check value data for a first track of the plurality of tracks in a first sector on the disk medium and check value data for a second track of the plurality of tracks in a second sector on the disk medium that is adjacent to the first sector, the first sector and the second sector being disposed in a third track of the plurality of tracks.

9. The method of claim 8, wherein
the first sector comprises a first check value sector that stores the check value data for the first track and no check value data for any other track of the plurality of tracks, and
the second sector comprises a second check value sector that stores the check value data for the second track and no check value data for any other track of the plurality of tracks.

10. The method of claim 8,
wherein the check value data is generated by performing XOR operations on the data stored in the one or more sectors of the track.

11. The method of claim 8,
wherein the third track includes a plurality of check value sectors and no user data sectors.

12. The method of claim 8,
wherein the third track is adjacent to a fourth track that includes a plurality of check value sectors and no user data sectors.

13. The method of claim 12,
wherein the third track is adjacent to the fourth track on a first side of the third track and is adjacent to an empty area on a second side of the third track, wherein the empty area separates the third track from a fifth track that includes user data.

14. The method of claim 8,
wherein when data is written to a user data sector of a particular track in the plurality of tracks, check value data is recalculated for the particular track and the recalculated check value data is written in a check value sector of the particular track.

\* \* \* \* \*